(12) United States Patent
Benjamin et al.

(10) Patent No.: US 7,356,484 B2
(45) Date of Patent: Apr. 8, 2008

(54) SELF-LEARNING METHOD AND APPARATUS FOR RATING SERVICE PROVIDERS AND PREDICTING FUTURE PERFORMANCE

(75) Inventors: Michael H. Benjamin, Dover, MA (US); Francis A. Waldman, Stoneham, MA (US); Richard von Turkovich, Cambridge, MA (US); Everette T. Jordan, Needham, MA (US)

(73) Assignee: Agile Software Corporation, San Jose, CA (US)

( * ) Notice: Subject to any disclaimer, the term of this patent is extended or adjusted under 35 U.S.C. 154(b) by 922 days.

(21) Appl. No.: 09/970,455

(22) Filed: Oct. 3, 2001

(65) Prior Publication Data

US 2002/0107723 A1     Aug. 8, 2002

Related U.S. Application Data

(60) Provisional application No. 60/237,666, filed on Oct. 3, 2000.

(51) Int. Cl.
 *G06Q 10/00*     (2006.01)
(52) U.S. Cl. .......................... 705/11; 705/10
(58) Field of Classification Search ................. 705/10, 705/11
See application file for complete search history.

(56) References Cited

U.S. PATENT DOCUMENTS

| | | | | |
|---|---|---|---|---|
| 5,369,570 | A * | 11/1994 | Parad | 705/8 |
| 5,550,746 | A * | 8/1996 | Jacobs | 700/231 |
| 5,819,232 | A * | 10/1998 | Shipman | 705/8 |
| 6,249,785 | B1 * | 6/2001 | Paepke | 707/5 |
| 6,308,161 | B1 * | 10/2001 | Boden et al. | 705/7 |

(Continued)

FOREIGN PATENT DOCUMENTS

WO    WO 00/45628    8/2000

(Continued)

OTHER PUBLICATIONS

Prasad, Biren; "JIT Quality Matrices for strategic planning and implementation", 1995, International Journal of Operations & Production Management, v15n9, pp. 116-142.*

(Continued)

*Primary Examiner*—Beth Van Doren
*Assistant Examiner*—Jonathan G Sterrett
(74) *Attorney, Agent, or Firm*—Townsned and Townsend and Crew LLP

(57) ABSTRACT

In one aspect, the invention relates to a method for creating a supplier-rating matrix for rating services of a supplier. The method includes defining a plurality of job attributes each including a plurality of sub-attributes, each sub-attribute representing a range of job attribute values and defining a job attribute vector associated with the supplier, the job attribute vector including a plurality of dimensions each corresponding to a sub-attribute. The method further includes defining a plurality of performance metrics and defining a performance vector associated with the supplier, the performance vector including a plurality of dimensions each corresponding to a performance metric. The method further includes defining a initial values for the job attribute vector and the performance vector and generating a supplier rating matrix for the supplier by mathematically combining the job attribute vector and the performance vector.

14 Claims, 2 Drawing Sheets

U.S. PATENT DOCUMENTS

| | | | | |
|---|---|---|---|---|
| 6,393,406 | B1 * | 5/2002 | Eder | 705/7 |
| 6,487,541 | B1 * | 11/2002 | Aggarwal et al. | 705/26 |
| 6,631,305 | B2 * | 10/2003 | Newmark | 700/110 |
| 6,631,365 | B1 * | 10/2003 | Neal et al. | 707/2 |
| 6,708,155 | B1 * | 3/2004 | Honarvar et al. | 705/7 |
| 6,895,385 | B1 * | 5/2005 | Zacharia et al. | 705/10 |

FOREIGN PATENT DOCUMENTS

| | | |
|---|---|---|
| WO | WO 01/59588 | 8/2001 |

OTHER PUBLICATIONS

Guttman, Robert H., "Merchant Differentiation through Integrative Negotiation in Agent-minded Electronic Commerce", MS Thesis, MIT Department of Media Arts and Sciences, May 7, 1999, pp. 1-153.*

Mohanty, R P; Deshmukh, S G; "Use of analytic hierarchic process for evaluating sources of supply", 1993, International Journal of Physical Distribution & Logistics Management, v23n3, pp. 22-28, Dialog 00771452 94-20844.*

Youssef, Mohamed A; Mohammed Zairi; Bidhu, Mohanty; "Supplier selection in an advanced manufacturing technology environment: an optimization model", 1996, Benchmarking for Quality Management & Technology, v3n4, pp. 60, Dialog 02243566 84986974.*

Ncube, Matotent M; "A Comparison of Cusum-Cuscore and Ewma-Cuscore Quality Control Procedures", 1992, International Journal of Quality & Reliability Management, v9n5, pp. 42-50, Dialog 00658134 93-07355.*

Teresko, John, "E-collaboration", Jun. 12, 2000, IndustryWeek, Cleveland, vol. 249, Iss. 11, p. 31(4), ProQuest ID 55349171.*

Sheridan, John M; "Bridging the Enterprise Gap", Apr. 1999, IndustryWeek, vol. 248, Iss. 7, p. 17, ABI/INFORM Global.*

Edwards, Jeffrey R, "Problems with the use of profile similarity indices in the study of congruence in organizational research", Autumn 1993, Personnel Psychology, v46n3, pp. 641-665, Dialog 00769050 94-18442.*

Parasuraman, A; Zeithaml, Valarie A; Berry, Leonard L; "Reassessment of expectations as a comparison standard in measuring service quality: Implications for further research", Jan. 1994, Journal of Marketing, n58n1, pp. 111-124, Dialog 00807261 94-56653.*

Plummer, John, "Tighter process control with neural networks", Oct. 1993, AI Expert, v8, n10, p. 49(7), Dialog 01619799 14366710.*

Teas, R. Kenneth; "Expectations, performance evaluation, and consumer's perceptions of quality", Oct. 1993, Journal of Marketing, v57n4, pp. 18-34, Dialog 00774399 94-23791.*

Partovi, Fariborz Y; Hopton, Walter E; "The analytic hierarchy process as applied to two types of inventory problems", First Quarter 1993, Production & Inventory Management Journal, v35n1, pp. 13-19, Dialog 00857081 95-06473.*

Davis, Lesley; Williams, Glyn; "Evaluating and Selecting simulation software using the analytic hierarchy process", 1994, Integrated Manufacturing Systems, v5n1, pp. 23-32, Dialog 00861502 95-10894.*

Belardo, Salvatore; Duchessi, Peter; Coleman, John R; "A strategic decision support system at Orell Fussli", Spring 1994, Journal of Management Information Systems: JMIS, v10n4, pp. 135-157, Dialog 00904600 95-53992.*

Ahire, Sanja L; Rana, Dharam S; "Selection of TQM pilot projects using an MCDM approach", 1995, International Journal of Quality & Reliability Management, v12n1, pp. 61-81, Dialog 00997229 96-46622.*

Prasad, Biren; "Synthesis of market research data through a combined effort of QFD, value engineering and value graph techniques", 1998, Qualitative Market Research, v1n3, pp. 156-172, Dialog 02329178 86924658.*

Hauser, John R; Clausing, Don; "The House of Quality", May-Jun. 1988, Harvard Business Review, Reprint 88307, pp. 1-13.*

PR Newswire, "Agile Software Launches Agile Anywhere™ B2B E-commerce Applications for the Integrated Supply Chain", Jun. 15, 1999, New York, p. 1, ProQuest ID 42399679.*

PR Newswire, "Agile, Si2, Demonstrate Internet-Based Information Standard for Electronic Components", Jun. 22, 1999, New York, p. 1, ProQuest ID 42583206.*

Banfield, Emiko; "Harnessing Value in the Supply Chain", © 1999, John Wiley & Sons, pp. 189-205, 224-227, 233-235, 253-269, 281-285.*

Grittner, Peter; "Four Elements of Successful Sourcing Strategies (Commitment and coordination, with a view towards cost analysis, are needed with partners who supply goods and services)", Oct. 1996, Management Review, v 85, n 10, p. 41-45, Dialog 00511587 23656161.*

Aberdeen Group, "Strategic Sourcing: Key to Competitiveness in the Internet Economy", Sep. 2000, Aberdeen Group, Inc., Boston, pp. 1-18.*

Mohamed A. Youssef; Mohammed Zairi; Bidhu Mohanty; "Supplier selection in an advanced manufacturing technology environment: an optimization model", 1996, Benchmarking for Quality Management & Technology v3n4 pp. 60, Dialog 02243566 84986974.*

Smytka, Daniel; Clemens, Michael; "Total Cost Supplier Selection Model: A Case Study", Winter 1993, 39, 1; ABI/INFORM Global, pp. 42-49.*

* cited by examiner

SELF-LEARNING METHOD AND APPARATUS FOR RATING SERVICE PROVIDERS AND PREDICTING FUTURE PERFORMANCE

CROSS-REFERENCE TO RELATED APPLICATIONS

This application claims priority to U.S. provisional application Ser. No. 60/237,666, filed Oct. 3, 2000. This co-pending application is incorporated herein by reference in its entirety.

TECHNICAL FIELD

The invention relates generally to automated supplier selection. More specifically, the invention relates to an apparatus and methods for utilizing a supplier-rating matrix to obtain information about those services for which a given supplier is best suited.

BACKGROUND

Companies engaged in commerce have often looked to third party rating systems for guidance when electing a potential business partner. Firms such as Moodys and Standard & Poor rate a firm's debt offerings, and Dun and Bradstreet (D&B) provides ratings about a firm's creditworthiness. With the rise of a global economy, firms have more choices for partners and an increased need for objective third party ratings.

Internet commerce companies such as OpenRatings and eBay provide ratings based on feedback from prior customers. More elaborate systems have been developed to rate distributors and retailers in marketplaces for known products, such as those employed by Frictionless Commerce. (See, for example, Guttman, Robert H., "Merchant Differentiation through Integrative Negotiation in Agent-minded Electronic Commerce", MS Thesis, MIT Department of Media Arts and Sciences, May 7, 1999).

All of these rating systems help firms understand the prospective business partner's ability to please its customers. The weakness of such systems is that they do not take into account the idiosyncrasies of the service for which the party was rated. For example, if a party has received numerous positive ratings as a seller and shipper of record albums, that rating has little relevance if you are considering shipping services for furniture.

SUMMARY OF THE INVENTION

The invention fills the need for unbiased rating information that continues to grow as companies expand their reach for trading partners. The invention features a supplier-rating matrix for rating and predicting future performance of service providers, providing valuable insight for buyers looking to purchase specialized services in a marketplace.

The invention uses customer satisfaction ratings, mapped against the attributes of the job or service performed to build a task-specific supplier-rating matrix. The supplier-rating matrix can be used with proposed job attributes and desired performance metrics to predict a supplier's performance for a specific proposed job. A traditional rating system answers the question "Is this a good vendor?". The subject invention answers the question "Is this a good vendor for this particular job?". Furthermore, the invention features a self-learning function, i.e. the ratings become more accurate as job performance knowledge is accumulated. The invention can be implemented in various ways. For example, it can be implemented in hardware and/or software. The invention also can be provided on a web page on the Internet, through a client/server system, over an Intranet, on an Internet appliance and/or on a personal computer. The system maybe used as part of marketplace with numerous buyers and suppliers or for a single enterprise in which case the enterprise is the sole buyer with a plurality of suppliers.

The invention can be applied in any marketplace in which suppliers provide services to buyers. For example, the invention could be used in the markets of construction services, manufacturing services, engineering services, catering, auto repair, or tailoring. One specific example of the invention is in the purchase and supply of custom fabricated metal and plastic parts. In the target market, the buyers are typically original equipment manufacturers (OEMs) looking to outsource the production of certain custom designed parts or components. These parts are not readily available and must be custom built to the buyer's engineering specifications. The suppliers are typically job shops that specialize in one or more metal or plastic fabrication technologies. Buyers want to find the supplier with the equipment and expertise that best matches the requirements of the job. Jobs vary widely in terms of such factors as the processes used (machining, molding, casting, etc) desired production volumes (from one part to millions), required precision, speed of delivery, and level of quality. Furthermore, the buyer may have a different set of performance goals for each job. For example, on some jobs the speed of completion may be the most important performance metric, while on others the cost or quality level may be paramount.

In one aspect, the invention relates to a method for creating a supplier-rating matrix for rating services of a supplier. The method includes defining a plurality of job attributes each including a plurality of sub-attributes, each sub-attribute representing a range of job attribute values and defining a job attribute vector, the job attribute vector including a plurality of dimensions each corresponding to a sub-attribute. The method further includes defining a plurality of supplier performance metrics and defining a supplier performance vector, the performance vector including a plurality of dimensions each corresponding to a performance metric. The method further includes defining a first initial value for the job attribute vector, defining a second initial value for the performance vector and generating a supplier rating matrix for the supplier by mathematically combining the job attribute vector and the performance vector.

In one embodiment, the job attribute vector is a first job attribute vector, the performance vector is a first performance vector and the supplier rating matrix is a first supplier rating. In this embodiment, the method further includes receiving data associated with a specific service supplied to a customer of the supplier and generating a second performance vector in response to the received data. The method further includes generating a second job attribute vector in response to the specific service, the second job attribute vector indicating which range of job attribute values are associated with the specific service, defining a weighting factor and generating a second supplier rating matrix for the supplier by mathematically combining the first supplier rating matrix, the weighting factor, the second job attribute vector and the second performance vector.

In another embodiment, the method includes providing a second supplier-rating matrix associated with a second supplier and receiving data associated with a proposed job. The method further includes generating a second performance vector in response to the received data and generating a second job attribute vector in response to the received data, the second job attribute vector indicating which range of job attribute values are associated with the proposed job. The method further includes selecting the first or second supplier based on the first supplier matrix, the second supplier matrix, the second performance vector and the second job attribute vector. In another embodiment, the method further includes rating the supplier based on the supplier-rating matrix, the second performance vector and the second job attribute vector.

In yet another embodiment, the method further includes defining the plurality of job attributes and the plurality of sub-attributes using a technical requirements specification of a customer of a supplier. In another embodiment, the method further includes defining the plurality of job attributes to include dimensional tolerance, turnaround time and quantity. In another embodiment, the method further includes defining the plurality of sub-attributes corresponding to the dimensional tolerance attribute to include a plurality of ranges of tolerance values, defining the plurality of sub-attributes corresponding to the quantity attribute to include a plurality of ranges of quantity values and defining the plurality of sub-attributes corresponding to the turnaround time attribute to include a plurality of ranges of times.

In yet another embodiment, the method further includes defining the plurality of performance metrics to include speed, quality, cost and service. In another embodiment, the supplier-rating matrix includes a number of columns and a number of rows. In this embodiment, the step of generating further comprises multiplying the job attribute vector by the performance vector, resulting in the supplier rating matrix including the number of columns corresponding to the number of dimensions of the job attribute vector and the number of rows corresponding to the number of dimensions of the performance vector.

In yet another embodiment, the step of generating the second supplier rating matrix further comprises multiplying the second job attribute vector by the second performance vector, thereby generating a third supplier rating matrix and multiplying the first supplier rating matrix by the weighting factor, thereby generating a fourth supplier-rating matrix. The method further includes multiplying the third supplier rating matrix by the difference of one minus the weighting factor, thereby generating a fifth supplier rating matrix and adding the fourth supplier rating matrix to the fifth supplier rating matrix, thereby generating the second supplier rating matrix.

In another aspect, the invention relates to a system for creating a supplier-rating matrix for rating services of a supplier. The system includes an interface module and a matrix generator module. The interface module is adapted to define a plurality of job attributes each including a plurality of sub-attributes, each sub-attribute representing a range of job attribute values and adapted to define a plurality of performance metrics. The matrix generator module is adapted to define a job attribute vector with an initial value, the job attribute vector including a plurality of dimensions each corresponding to a sub-attribute, adapted to define a performance vector with an initial value, the performance vector including a plurality of dimensions each corresponding to a performance metric, and adapted to generate a first supplier rating matrix for the supplier by mathematically combining the job attribute vector and the performance vector.

In another embodiment, a hardware and/or software module is used to automatically construct the job attribute vector from the data available over a typical corporate network. For example, commercial information such as the quantity desired and turnaround time are available from an Enterprise Resource Planning (ERP) system (such as those available from companies such as SAP, ORACLE, and JD EDWARDS). Geometric attributes such as size, and tolerance level are available from a Computer Aided Design (CAD) system (such as PROENGINEER from PTC, SOLIDWORKS and SOLIDEDGE). Material specifications are available from a Product Data Management System (such as those available from MATIXONE, EIGNER+ PARTNER, and PTC). This automatic construction of the job attribute vector makes use of the system easier and provides the user with full benefit of their computerized product information.

In another embodiment, the job attribute vector is a first job attribute vector, the performance vector is a first performance vector and the supplier rating matrix is a first supplier rating matrix. In this embodiment, the interface module is further adapted to receive data associated with a specific service supplied to a customer of the supplier. The matrix generator module is further adapted to define a weighting factor, adapted to generate a second performance vector in response to the received data, adapted to generate a second job attribute vector in response to the specific service that indicates which range of job attribute values are associated with the specific service and adapted to generate a second supplier rating matrix for the supplier by mathematically combining the first supplier rating matrix, the weighting factor, the second job attribute vector and the second performance vector.

In another embodiment, the system includes a selector module. The matrix generator module is further adapted to provide a second supplier-rating matrix associated with a second supplier. The interface module is adapted to receive data associated with a proposed job. The selector module is adapted to generate a second performance vector in response to the received data, adapted to generate a second job attribute vector in response to the received data, the second job attribute vector indicating which range of job attribute values are associated with the proposed job and adapted to select the first or second supplier based on the first supplier matrix, the second supplier matrix, the second performance vector and the second job attribute vector. In yet another embodiment, the system includes a server in communication with a client via a network, wherein the server includes the interface module and the matrix generator module.

In another aspect, the invention relates to an article of manufacture having computer-readable program means for creating a supplier-rating matrix for rating services of a supplier. The article includes computer-readable program means for performing the steps of the methods as described above.

BRIEF DESCRIPTION OF THE DRAWINGS

The above and further advantages of the invention may be better understood by referring to the following description taken in conjunction with the accompanying drawing, in which.

DETAILED DESCRIPTION

Figure 1A:
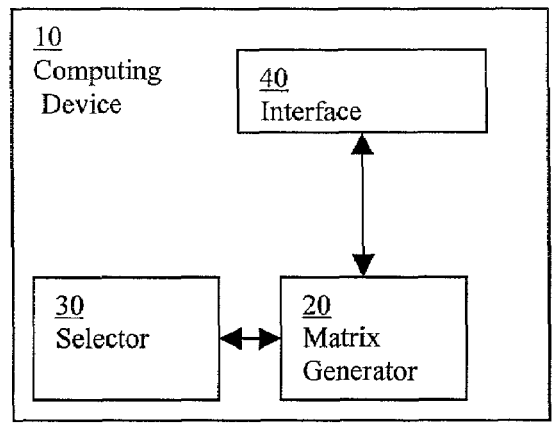
FIGS. 1*a* and 1*b* are block diagrams of illustrative systems for generating and maintaining the supplier-rating matrix and employing it to select a supplier.

As illustrated in FIG. 1a, an embodiment of the invention can include a stand-alone computing device 10. The computing device 10 includes a matrix generator module 20, a selector module 30 and an interface module 40. The matrix generator module 20 and the selector module 30 can be implemented in hardware and/or software. The matrix generator module 20 is in electrical communication with the selector module 30 and the interface module 40.

The computing device 10 can be any personal computer (e.g., 286, 386, 486, Pentium, Pentium II, IBM PC-compatible, etc), Macintosh computer, RISC Power PC, X-device, workstation, mini-computer, main-frame computer or other computing device adapted to generate and utilize a supplier-rating matrix to obtain information about supplier services. The computing device 10 can include a display screen, a keyboard and an input device (e.g., a mouse), not shown. The optional interface module 40 is in electrical communication with the keyboard, the display and/or the mouse. Any one of a variety of operating system platforms can run on the computer device 10, including, for example, DOS, Windows 3.x, Windows 95, Windows 98, Windows NT 3.51, Windows NT 4.0, Windows CE, Macintosh, Java, or Unix.

Figure 1B:
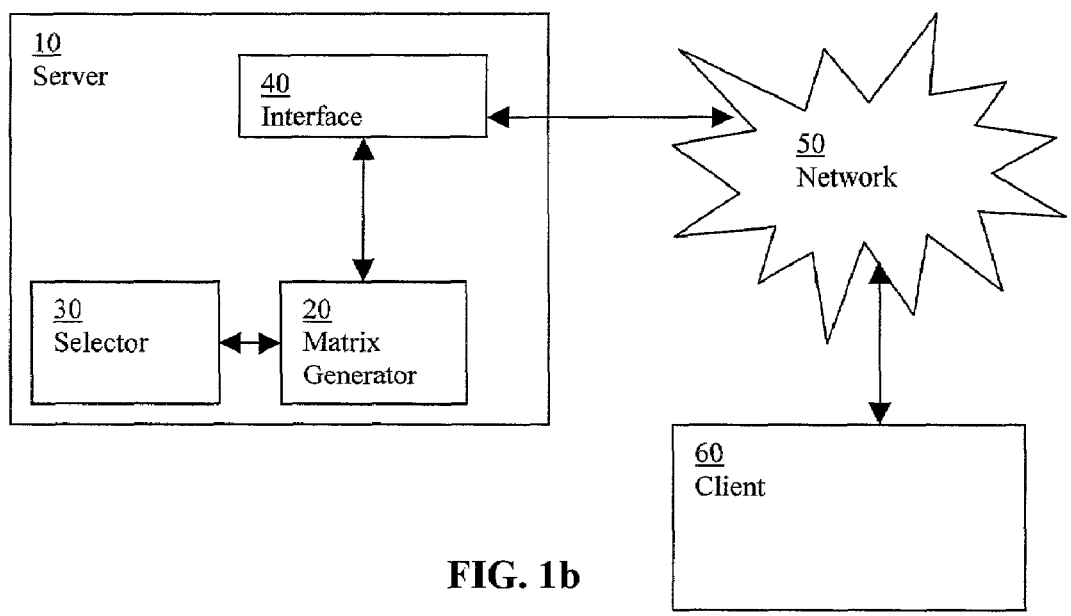

As illustrated in FIG. 1b, in another embodiment, the computer system 10 can be connected to a communications network 50, which can be, for example, a local-area network (LAN) or a wide area network (WAN) such as the Internet or the World Wide Web. The computer device 10 can connect to the network 50 through a variety of connections including standard telephone lines, LAN or WAN links (e.g., T1, T3, 56 kb, X.25), broadband connections (ISDN, Frame Relay, ATM), or wireless connections. Connections can be established using a variety of communication protocols (e.g., TCP/IP, IPX, SPX, NetBIOS, Ethernet, RS232, or direct asynchronous connections). When connected to the network 50, the computer device 10 can function as a Web server that provides access to the matrix generator module 20 by other users connected to the network 50 via a client 60.

Figure 2:
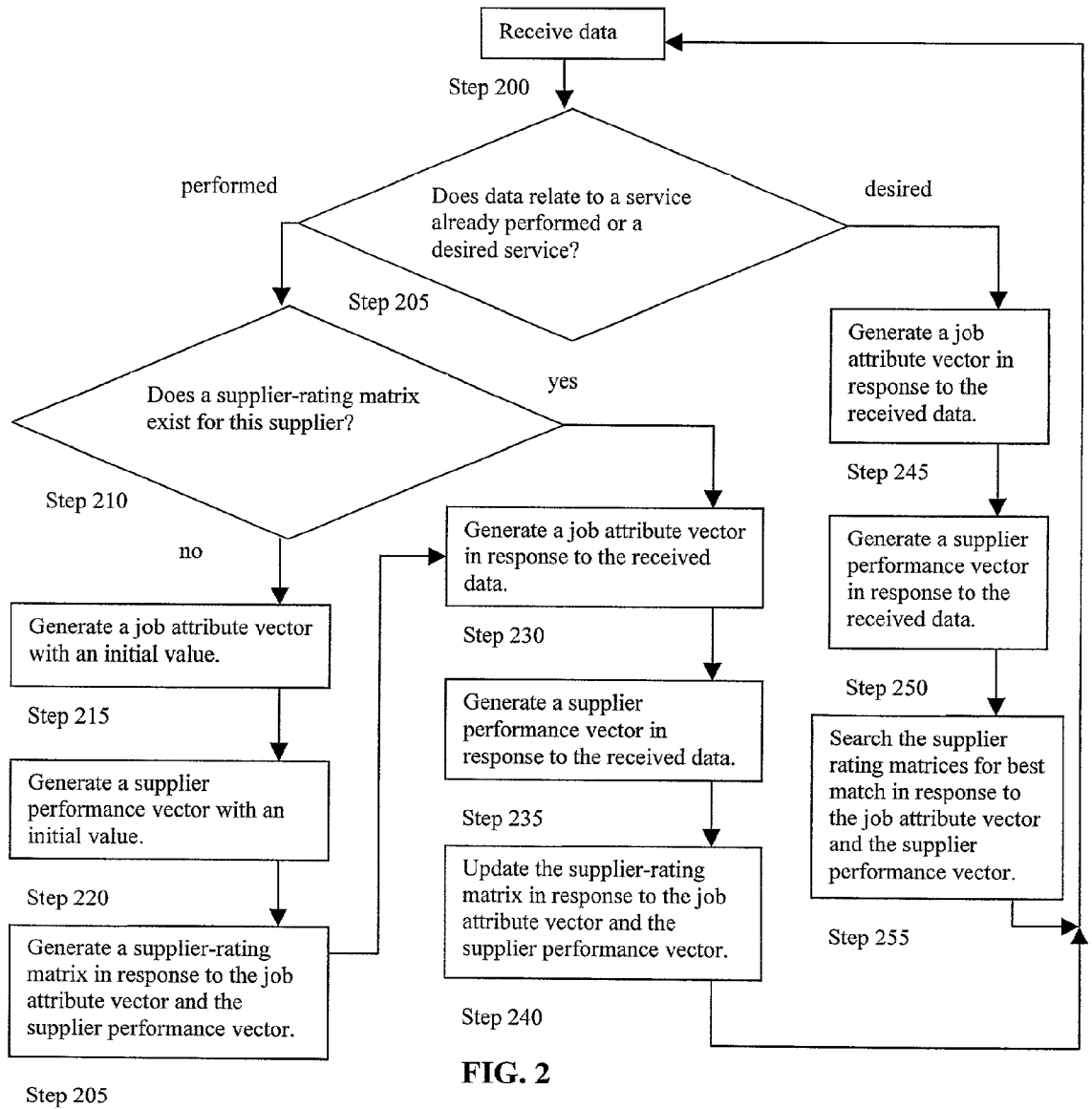
FIG. 2 is a flow diagram of an illustrative process for generating and maintaining the supplier-rating matrix and employing it to select a supplier.

FIG. 2 is a flow diagram of the process of one embodiment of the invention. The interface 40 of the computing device 10 receives (step 200) data. The data can be generated by, for example, a keyboard (if it is a stand-alone computing device 10 as illustrated in FIG. 1a) or from the client 60 (if connected to a network 50 as illustrated in FIG. 1b). The data is transmitted from the interface 40 to the matrix generator 20, which determines (step 205) whether the data relates to a service already performed or a desired service.

If the data relates to a service already performed, the matrix generator 20 determines (step 210) whether a supplier-rating matrix exists for the supplier that performed the service. If a matrix does not exist, the matrix generator 20 generates an initial matrix for this supplier. The matrix generator 20 generates (step 215) a job attribute vector with an initial value. As described in more detail in the examples below, the service provided by the supplier is defined by a plurality of job attributes. Each of these job attributes can have many different values. The values of each job attribute are grouped into a plurality of ranges, each range referred to as a sub-attribute. The matrix generator 20 defines a dimension in the job attribute vector for each sub-attribute. The initial value of each dimension of the vector can be, for example, a unity value, such as one.

The matrix generator 20 also generates (step 220) a performance vector. As described in more detail in the examples below, the matrix generator 20 defines a plurality of performance metrics. The matrix generator 20 defines a dimension in performance vector for each performance metric. The initial value for each dimension of the performance vector can be, for example, an average or middle value, such as 3 out of 5. With the job attribute vector and the performance vector defined, the matrix generator 20 generates (step 225) the supplier-rating matrix using the two vectors. The examples below describe mathematically combining these two vectors to generate the matrix. With the initial matrix created, or if the matrix generator 20 determines (step 210) a supplier rating matrix already exists for this supplier, the matrix generator 20 proceeds to updating the matrix in response to the received data.

Using the received data, the matrix generator 20 generates (step 230) a job attribute vector. The job attribute indicates which sub-attributes are applicable for the performed service. This can be done, for example, by using ones in those dimensions of the vector corresponding to the applicable sub-attributes and using zeros in those dimensions corresponding to non-applicable sub-attributes.

The matrix generator 20 also generates (step 235) a performance vector. The matrix generator 20 uses the received data to establish a value for each dimension in the performance vector. With the job attribute vector and the performance vector defined, the matrix generator 20 updates (step 240) the supplier rating matrix using the two vectors generated in response to the received data. As described in more detail in the examples below, the matrix generator 20 mathematically combines these two vectors generated in response to the received data with the existing matrix for that supplier to update the matrix. In one embodiment, the matrix generator 20 defines a weighting factor. The weighting factor is used to weight the two vectors generated in response to the received data in relation to the data in the existing supplier-rating matrix.

If the matrix generator determines (step 205) that the received data relates to a service that is desired, the matrix generator 20 generates (step 245) a job attribute vector. The job attribute indicates which sub-attributes are applicable for the desired service. This can be done, for example, by using ones in those dimensions of the vector corresponding to the applicable sub-attributes and using zeros in those dimensions corresponding to non-applicable sub-attributes.

The matrix generator 20 also generates (step 250) a performance vector. The matrix generator 20 uses the received data to establish a value for each dimension in the performance vector, indicating the desired value and/or the importance of each to the user supplying the data. With the job attribute vector and the performance vector defined, the matrix generator 20 searches (step 255) the existing supplier rating matrices using the two vectors generated in response to the received data. As described in more detail in the examples below, the matrix generator 20 mathematically combines these two vectors generated in response to the received data to generate values for an ideal supplier-rating matrix. The selector module 30 searches the existing supplier-rating matrices and selects the supplier with an existing supplier-rating matrix that is closest to the ideal supplier-rating matrix. This selection is returned to the sender of the received data.

In another embodiment, not shown, the user who sent the data may be interested in a specific supplier. In this embodiment, the selector module 30 compares the supplier-rating matrix of the specific supplier with the ideal supplier-rating matrix. The comparison identifies the performance metrics that are predicted to exceed the user's desired performance for that specific supplier. For example, the value in the existing supplier-rating matrix is greater than the corresponding value in the ideal supplier-rating matrix. The comparison also identifies the performance metrics that are predicted to not meet the user's desired performance for that specific supplier. For example, the value in the existing supplier-rating matrix is less than the corresponding value in the ideal supplier-rating matrix. This process helps the user identify the future performance of the supplier and assess whether those metrics that will not meet the user's desired performance are acceptable.

In more detail, one aspect of the invention is a supplier-rating matrix ([SR]). A separate supplier-rating matrix is kept for each supplier in the marketplace. A supplier-rating matrix contains a summary of a given supplier's past job performance and can be used to predict their performance on future jobs. The performance of a supplier is quantified in a Performance Vector (P). The desired performance ($P_{des}$) is specified when looking for a supplier and the actual performance ($P_{act-i}$) supplied by the buyer in a post-job questionnaire. The attributes of a job ($A_i$) are described mathematically as a vector in a multidimensional attribute space.

Updating a Supplier-rating matrix after a job can be described as follows in Equation 1:

$$[SR_A]_{new} = f(P_{act-i}, A_i, [SR_A]_{old}) \quad (1)$$

where:

$[SR_A]_{new}$=Updated Supplier-rating matrix for Supplier A;
$P_{act-i}$=Actual performance rating vector for job i;
$A_i$=Attributes of job i; and
$[SR_A]_{old}$=Supplier-rating matrix for supplier A before updating To determine the rating or suitability of a given supplier for a new job (job k) the process is run in reverse such that:

$$R_{Ak} = f(P_{des-k}, A_j, [SR_A]) \quad (2)$$

where:

$R_{Ak}$=Rating for supplier A doing job k;
$P_{des-k}$=Desired performance rating vector for job k;
$A_k$=Job Attributes for job k; and
$[SR_A]$=Supplier-rating matrix for supplier A.

The variables are more fully described below and in the examples. A simple example showing one rating being added to the matrix and using the matrix to predict performance is shown in Table 1. A longer example using the same size and type of Supplier-Rating Matrix follows.

Supplier-rating Matrix:

Each row of the supplier-rating matrix corresponds to a dimension of the performance vector, P. These dimensions are metrics by which a buyer could subjectively rate a supplier. In the examples, four performance dimensions of, speed, quality, cost and service are used. The invention supports the use of more or fewer performance dimensions. One of the benefits of the invention is that the number of performance dimensions can be kept small to make data collection easier.

TABLE 1

Example
A Self-Learning Method for Rating Service Providers and Matching them with Prospective Customers Part 1: Supplier Rating Matrix Before Feedback
Avg Score (Range 0-5)

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 2.80 | 3.00 | 3.00 | 3.00 | 3.00 | 3.00 | 3.00 | 3.00 | 3.00 | 3.00 |
| Quality | 3.00 | 3.00 | 3.00 | 3.00 | 3.00 | 3.00 | 3.00 | 3.00 | 3.00 | 3.00 |
| Cost | 3 00 | 3.00 | 3.00 | 3.00 | 3.00 | 3.00 | 3.00 | 3.00 | 3.00 | 3.00 |
| Service | 3.00 | 3.00 | 3.00 | 3.00 | 3.00 | 3.00 | 3.00 | 3.00 | 3.00 | 3.00 |

Part 2: Applying Customer Feedback
Actual Performance
Rating - Pact

| | |
|---|---|
| Speed | 6 |
| Quality | 4 |
| Cost | 1 |
| Service | 2 |

Job Attributes

| | Dimensional Tolerance | | | Turnaround | | | Quantity | | | |
|---|---|---|---|---|---|---|---|---|---|---|
| | 001" | .005" | .010"+ | 0-6 days | 1-4 wks | 1 + mon. | 1-10 | 11-100 | 101-1000 | 1001+ |
| Job Attribute Vector, A = | 0 | 0 | 1 | 0 | 1 | 0 | 0 | 0 | 1 | 0 |

Vendor Rating Matirx After Applying Feedback

Filter Value    0.2

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 2.80 | 3.00 | 3.40 | 3.00 | 3.40 | 3.00 | 3.00 | 3.00 | 3.40 | 3.00 |

TABLE 1-continued

Example
A Self-Learning Method for Rating Service Providers and Matching them with Prospective Customers

| | | | | | | | | | | |
|---|---|---|---|---|---|---|---|---|---|---|
| Quality | 3.00 | 3.00 | 3.20 | 3.00 | 3.20 | 3.00 | 3.00 | 3.00 | 3.20 | 3.00 |
| Cost | 3.00 | 3.00 | 2.60 | 3.00 | 2.60 | 3.00 | 3.00 | 3.00 | 2.60 | 3.00 |
| Service | 3.00 | 3.00 | 2.80 | 3.00 | 2.80 | 3.00 | 3.00 | 3.00 | 2.80 | 3.00 |

Part 3: Rating a Supplier for a Proposed Job
Desired Performance
Rating: Pdes

| | |
|---|---|
| Speed | 5 |
| Quality | 4 |
| Cost | 2 |
| Service | 1 |

Job Attributes

| Dimensional Tolerance | | | Turnaround | | | Quantity | | | |
|---|---|---|---|---|---|---|---|---|---|
| .001" | .005" | .010"+ | 0-6 days | 1-4 wks | 1 + mon. | 1-10 | 11-100 | 101-1000 | 1001+ |
| Job Attribute Vector, A = 0 | 1 | 0 | 0 | 1 | 0 | 0 | 0 | 1 | 0 |

Vendor Rating for Proposed Job

| | Before feedback | | After feedback | |
|---|---|---|---|---|
| Score | Raw | Weighted | Raw | Weighted |
| Speed | 3.00 | 1.25 | 3.27 | 1.36 |
| Quality | 3.00 | 1.00 | 3.13 | 1.04 |
| Cost | 3.00 | 0.50 | 2.73 | 0.46 |
| Service | 3.00 | 0.25 | 2.87 | 0.24 |
| Total | | 3.00 | | 3.10 |
| Average Rating | 3.00 | | 3.00 | |

Columns of the supplier-rating matrix are divided into groups. Each group of columns corresponds to a job attribute. An attribute is a measurable characteristic of the job such as the quantity of parts made, the turnaround time, the level of precision, or the number of operations required to fabricate a part. Each set of attributes is divided into a number of columns with each column assigned a range of attribute values. Any number of sub-columns may be employed for each attribute. In one embodiment, 2-5 columns per attribute are used.

In the examples, three job attributes are used, dimensional tolerance, turnaround time, and quantity. Dimensional tolerance is broken into three columns corresponding to tight tolerance (0.001"), medium tolerance (0.005") and loose tolerance (0.010"). These three columns represent the three ranges of values of the 'dimensional tolerance' attribute (i.e., the sub-attributes). Turnaround time is also divided into three columns, fast (0-6 days), medium (1-4 weeks), and long (1 month or more). These three columns represent the three ranges of values of the 'turnaround time' attribute (i.e., the sub-attributes). The quantity attribute is divided into four columns, prototype quantities (1-10), small (11-100), medium (101-1000) and large (1001+). These four columns represent the three ranges of values of the 'quantity' attribute (i.e., the sub-attributes). For the purpose of illustration, the supplier has achieved a 3.0/5.0 rating in each category with the exception of the upper left entry. The interpretation of the 2.8 rating in the upper left corner of the matrix is "for jobs with a precision of 0.001," this supplier gets a "2.8/5.0 rating for Speed."

Applying Customer Feedback to the Supplier-rating Matrix

In Step 2 of the example in Table 1, the supplier has just completed a job for the customer. The customer rates the supplier in the four areas of speed, quality, cost and service. The results are expressed on a scale of 0-5 in the Actual Performance Vector, Pact. In the example the vendor earned a perfect 5/5 rating for speed, a good 4/5 rating for quality, poor 1/5 mark for cost and below average rating of 2/5 for service. Not shown are 3/5, which indicates an average rating and 0/5, which indicates an unacceptable rating.

Job Attribute Vector

The job attribute vector A is created by putting a one in each sub-column that corresponds to an attribute of the job. If the attribute does not apply to the job then no entry should be made for the specific job. The job being rated in Step 2 of the example has the following attributes: loose tolerance of 0.010", turnaround of 1-4 weeks and quantity of 101-1000 parts.

Updating the Supplier-rating Matrix

Updating is done based on the performance rating given by the buyer, Pact, and the job attribute, A. There are a variety of formulas that can be used to update the elements of the Supplier-rating matrix. In the examples, the following method is used:

$$(SR_{m,n})_{new} = (h)(P_{act-m})(A_n) + (1-h)(SR_{m,n})_{old}$$

where:

$(SR_{m,n})_{new}$ = The new value of the element in row m and column n of the Supplier-Rating Matrix;

h=filter constant (i.e., weighting factor) which is fraction between 0 and 1. A small value weighs past performance stronger; a high (closer to 1) value weighs recent performance more strongly. A value of 0.2 is used in the example;

$P_{act-m}$=The $m^{th}$ value in the performance vector. For example, for m=2 it is the $2^{nd}$ element of the Performance vector;

$A_n$=The $n^{th}$ value in the job attribute vector. For example, for n=2 it is the $2^{nd}$ element of the Job attribute vector; and $(SR_{m,n})_{old}$=The old value of the element in row m and column n of the Supplier-rating matrix;

With reference to the updated matrix in the example, notice that only those columns that correspond to attributes of the job that was rated have changed. Thus, a job with certain attributes affects only the supplier's ratings for jobs with similar attributes.

Using the Supplier-rating Matrix to Evaluate a Supplier

The supplier-rating matrix can be used to predict a supplier's performance for a given job. This process is shown in Step 3 of Table 1. Inputs to the process are: (1) a description of the job which in-turn yields a job attribute vector, A, and (2) a description of the desired performance as codified in the desired performance vector Pdes.

The overall rating, R, is calculated from the weighted average of the Ratings associated with each performance metric. The rating for the mth performance metric, Rm, is calculated as follows:

$$R_m = \left(\sum_{i=1}^{i=N}(A_i * SR_{m,i})\right) / \left(\sum_{i=1}^{i=N} A_i\right)$$

where:

$R_m$=the rating associated with the $m^{th}$ performance criteria;

$A_i$=the $i^{th}$ element of the job attribute vector;

$SR_{m,i}$=The element of the supplier-rating matrix associated with the $m_{th}$ row and $i_{th}$ column; and N=total number of columns in the supplier-rating matrix.

The overall Rating, R, is a weighted average of the performance ratings calculated as follows:

$$R = \left(\sum_{m=1}^{m=M} R_m * P_m\right) / \left(\sum_{m=1}^{j=M} P_m\right)$$

where:

$P_m$=the buyer performance rating for performance criteria m; and

M=total number of the performance criteria

In the example a new buyer is looking to evaluate the supplier. The buyer's performance criteria are expressed as: high desire for speed (5/5), concerned about quality (4/5), not to concerned about cost (2/5) and very little concern about service (1/5). A buyer constructs a desired performance vector like this to highlight his need for speed and quality. Not used in this example are desired performance values of (3/5) corresponding to medium concern and (0/5) which indicates that the attribute is irrelevant to the buyer.

The proposed job has the following attributes: medium tolerance (0.005"), medium turnaround (1-4 wks), and medium quantity (101-1000) parts. The resulting rating for the supplier is 3.10, which is higher than the rating of 3.0 the supplier would have received based on the initial supplier-rating matrix. The increase is attributed to the good job that the supplier did on a similar job. The buyer further notes that the supplier's ratings of 3.27 for speed and 3.13 for quality indicate better performance in the areas that count most for this buyer.

Using the Matrix with Multiple Jobs

A second example has been created to show the effect of using the method with multiple jobs. In this example a supplier starts with a perfectly average 3/5 rating in each cell of the supplier-rating matrix as shown below in Table 2.

TABLE 2

Example
Initial supplier Rating Matrix

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 3.00 | 3.00 | 3.00 | 3.00 | 3.00 | 3.00 | 3.00 | 3.00 | 3.00 | 3.00 |
| Quality | 3.00 | 3.00 | 3.00 | 3.00 | 3.00 | 3.00 | 3.00 | 3.00 | 3.00 | 3.00 |
| Cost | 3.00 | 3.00 | 3.00 | 3.00 | 3.00 | 3.00 | 3.00 | 3.00 | 3.00 | 3.00 |
| Service | 3.00 | 3.00 | 3.00 | 3.00 | 3.00 | 3.00 | 3.00 | 3.00 | 3.00 | 3.00 |

The supplier completes Job 1, which calls for loose tolerances, 1-4 week turnaround and 11-100 parts. The buyer rates the supplier high for speed (5/5) and quality (4/5), but is not impressed with the cost (2/5) or service (2/5). The performance vector, job attribute vector are shown below in Table 3, which includes the updated supplier-rating matrix.

TABLE 3

Example

Job 1:
Actual Performance
Rating: Pact

| | | |
|---|---|---|
| Speed | 5 | fast |
| Quality | 4 | high quality |
| Cost | 2 | expensive |
| Service | 2 | middling service |

| loose tolerance | med turnaround | med-high quantity |
|---|---|---|

Job Attributes

| | Dimensional Tolerance | | | Turnaround | | | Quantity | | |
|---|---|---|---|---|---|---|---|---|---|
| | .001" | .005" | .010"+ | 0-6 days | 1-4 wks | 1 + mon. | 1-10 | 11-100 | 101-1000 | 1001+ |
| Job 1 Attribute Vector, A = | 0 | 0 | 1 | 0 | 1 | 0 | 0 | 1 | 0 | 0 |

Vendor Rating Matrix After Applying Feedback from Job 1

| Filter Value | | | | | | | 0.2 | | | |
|---|---|---|---|---|---|---|---|---|---|---|

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 3.00 | 3.00 | 3.40 | 3.00 | 3.40 | 3.00 | 3.00 | 3.40 | 3.00 | 3.00 |
| Quality | 3.00 | 3.00 | 3.20 | 3.00 | 3.20 | 3.00 | 3.00 | 3.20 | 3.00 | 3.00 |
| Cost | 3.00 | 3.00 | 2.80 | 3.00 | 2.80 | 3.00 | 3.00 | 2.80 | 3.00 | 3.00 |
| Service | 3.00 | 3.00 | 2.80 | 3.00 | 2.80 | 3.00 | 3.00 | 2.80 | 3.00 | 3.00 |

The supplier does a poor job on Job 2. This job calls for tight tolerances, 1-4 week turnaround and 11-100 parts. The buyer rates the supplier poorly (2/5) in all areas with an especially low mark (1/5) for quality. The performance vector, job attribute vector are shown below in Table 4, which includes the updated supplier-rating matrix.

TABLE 4

Example

Job 2:
Actual Performance
Rating: Pact

| | | |
|---|---|---|
| Speed | 2 | slow |
| Quality | 1 | poor quality |
| Cost | 2 | expensive |
| Service | 2 | midling service |

| low tolerance | medium turnaround | low quantity |
|---|---|---|

Job Attributes

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Job 2 Attribute Vector, A = | 1 | 0 | 0 | 0 | 1 | 0 | 0 | 1 | 0 | 0 |

Vendor Rating Matrix After Applying Feedback from Job 2

| Filter Value | | | | | | | 0.2 | | | |
|---|---|---|---|---|---|---|---|---|---|---|

| | Dimensional Tolerance | | | Turnaround | | | Quantity | | | |
|---|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 2.80 | 3.00 | 3.40 | 3.00 | 3.12 | 3.00 | 3.00 | 3.12 | 3.00 | 3.00 |
| Quality | 2.60 | 3.00 | 3.20 | 3.00 | 2.76 | 3.00 | 3.00 | 2.76 | 3.00 | 3.00 |

TABLE 4-continued

| | Example | | | | | | | | | |
|---|---|---|---|---|---|---|---|---|---|---|
| Cost | 2.80 | 3.00 | 2.80 | 3.00 | 2.64 | 3.00 | 3.00 | 2.64 | 3.00 | 3.00 |
| Service | 2.80 | 3.00 | 2.80 | 3.00 | 2.64 | 3.00 | 3.00 | 2.64 | 3.00 | 3.00 |

The supplier completes Job 3 with high customer satisfaction. This job calls for loose tolerances, quick turnaround and a prototype number of (1-10) parts. The buyer rates the supplier excellent for speed (5/5) and very good (4/5) in the remaining categories of quality, cost and service. The performance vector, job attribute vector are shown below in Table 5, which includes the updated supplier-rating matrix.

around, and medium quantity job. As illustrated in Table 6, the buyer is most interested in speed and quality (5/5), and less concerned about price (2/5) and service (3/5). The resultant vendor rating for proposed Job A is an unimpressive 2.86. The buyer is especially concerned about the low

TABLE 5

Example

Job 3:
Actual Performance
Rating: Pact

| | | |
|---|---|---|
| Speed | 5 | fast delivery |
| Quality | 4 | good quality |
| Cost | 4 | expensive |
| Service | 4 | midiling service |

| high tolerance | quick turn | medium high quantity |
|---|---|---|
| | Job Attributes | |

| | Dimensional Tolerance | | | Turnaround | | | Quantity | | |
|---|---|---|---|---|---|---|---|---|---|
| | .001" | .005" | .010"+ | 0-6 days | 1-4 wks | 1 + mon. | 1-10 | 11-100 | 101-1000 | 1001+ |
| Job 3 Attribute Vector, A = | 0 | 0 | 1 | 1 | 0 | 0 | 1 | 0 | 0 | 0 |

Vendor Rating Matrix After Applying Feedback from Job 3

| Filter Value | | | | | | 0.2 | | | |

| | Dimensional Tolerance | | | Turnaround | | | Quantity | | |
|---|---|---|---|---|---|---|---|---|---|
| | .001" | .005" | .010"+ | 0-6 days | 1-4 wks | 1 + mon. | 1-10 | 11-100 | 101-1000 | 1001+ |
| Speed | 2.80 | 3.00 | 3.72 | 3.40 | 3.12 | 3.00 | 3.40 | 3.12 | 3.00 | 3.00 |
| Quality | 2.60 | 3.00 | 3.36 | 3.20 | 2.76 | 3.00 | 3.20 | 2.76 | 3.00 | 3.00 |
| Cost | 2.80 | 3.00 | 3.04 | 3.20 | 2.64 | 3.00 | 3.20 | 2.64 | 3.00 | 3.00 |
| Service | 2.80 | 3.00 | 3.04 | 3.20 | 2.64 | 3.00 | 3.20 | 2.64 | 3.00 | 3.00 |

Applying What Has Been Learned.

Two new buyers approach the supplier with jobs. The first buyer, with Job A, has a tight tolerance, medium turn- 2.79 rating for quality. This relatively low score is the result of the poor performance of the supplier in Job 2, which also had tight tolerances.

TABLE 6

Example

Proposed Job A
Desired Performance
Rating: Pdes

| | | |
|---|---|---|
| Speed | 5 | speed is important |
| Quality | 5 | quality is important |
| Cost | 2 | less concern about cost for this part |
| Service | 3 | |

| | tight tolerance | | | medium turn | | | medium quantity | | |
|---|---|---|---|---|---|---|---|---|---|
| | | | | Job Attributes | | | | | |
| | Dimensional Tolerance | | | Turnaround | | | Quantity | | |
| | .001" | .005" | .010"+ | 0-6 days | 1-4 wks | 1 + mon. | 1-10 | 11-100 | 101-1000 | 1001+ |
| Job A Attribute Vector, A = | 1 | 0 | 0 | 0 | 1 | 0 | 0 | 0 | 1 | 0 |

Vendor Rating for Proposed Job A

After feedback

| Score | Raw | Weighted | |
|---|---|---|---|
| Speed | 2.97 | 0.99 | |
| Quality | 2.79 | 0.93 | low quality number is cause for concern |
| Cost | 2.81 | 0.38 | |
| Service | 2.81 | 0.56 | |
| Total | | 2.86 | unimpressive rating, look for a different vendor |

The second buyer, with Job B, has a loose tolerance, quick turn-around, and medium quantity job. As illustrated in Table 7, the buyer is most interested in speed and quality (5/5), is concerned about price (4/5) and less concerned about service (3/5). The resultant vendor rating for proposed Job A is an impressive 3.20. The buyer will be especially excited about the high speed rating of 3.37 and the good quality number of 3.19. This impressive score is the result of the good performance of the supplier in jobs 1 and 3, which more closely resemble this job.

TABLE 7

Example

Proposed Job B
Desired Performance
Rating: Pdes

| | | |
|---|---|---|
| Speed | 5 | Speed is important |
| Quality | 5 | quality is important |
| Cost | 4 | cost less crucial |
| Service | 3 | |

| | loose tolerance | | | quick turn | | | med-high quantity | | |
|---|---|---|---|---|---|---|---|---|---|
| | | | | Job Attributes | | | | | |
| | Dimensional Tolerance | | | Turnaround | | | Quantity | | |
| | .001" | .005" | .010"+ | 0-6 days | 1-4 wks | 1 + mon. | 1-10 | 11-100 | 101-1000 | 1001+ |
| Job B Attribute Vector, A = | 0 | 0 | 1 | 1 | 0 | 0 | 0 | 0 | 1 | 0 |

Vendor Rating for Proposed Job B

| Score | Raw | Weighted | |
|---|---|---|---|
| Speed | 3.37 | 0.99 | does this kind of job fast |
| Quality | 3.19 | 0.94 | and with high quality |
| Cost | 3.08 | 0.72 | |
| Service | 3.08 | 0.54 | |
| Total | | 3.20 | impressive rating, this is a good choice |

Additional Features

In other embodiments, a supplier-rating matrix can have many more columns associated with additional Job attributes. In plastic processing, for example, there could be columns associated with the size of press involved, the type of polymer used, the secondary operations required, or the type and amount of filler material used in the plastic.

The supplier-rating matrix starts with some initial values. In one embodiment, a trained quality professional could estimate values for each entry in the supplier-rating matrix based on an inspection of the supplier's facility and interviews with past customers. Over time the input from actual customers will adjust for any incorrect initial assumptions. Essentially, the matrix 'learns' from the experience of the customers.

The filter constant (i.e., the weighting factor), h, in the preceding example can be modified over time to give more or less weight to recent performance evaluations. For example, suppliers with only a few evaluations may benefit from a higher filter constant so that a single good rating can move there numbers significantly. On the other hand, suppliers who have received several evaluations may benefit from a lower h value giving them a more stable rating.

Individual elements of the supplier-rating matrix can also be used to predict performance if a potential buyer has a narrow focus. For example, a buyer concerned with tight tolerance jobs could compare ratings from the tight tolerance column of the supplier-rating matrix independent of other attributes.

Equivalents

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for creating a supplier rating for a supplier, the method comprising:
    defining an initial supplier rating matrix populated by either average supplier ratings or by ratings determined by prior knowledge of a past history of said supplier's performance relative to average suppliers;
    defining a first job attribute vector, the first job attribute vector including a set of sub-attributes, the set of sub-attributes including at least one of a plurality of ranges of tolerance values, a plurality of ranges of quantity values, and a plurality of ranges of times;
    defining a first performance vector, the first performance vector including a set of performance metrics;
    wherein each performance metric is based upon the supplier's performance metric relative to an average performance metric for other suppliers that perform a job;
    defining a first matrix;
    calculating the first matrix based on at least a first filter constant, the first performance vector, and the first job attribute vector;
    wherein said first filter constant has a value between 0 and 1;
    calculating a second matrix, the second matrix based on at least 1 minus the first filter constant and the initial matrix;
    generating a feedback matrix by adding the first matrix to the second matrix;
    calculating a plurality of performance ratings each corresponding to a metric from the set of metrics from the feedback matrix; and
    calculating a final rating value in response to the plurality of performance ratings wherein the final rating is displayed to a customer through an interface in order to assess the supplier.

2. The method of claim 1, wherein the set of sub-attributes is defined using a technical requirements specification of a customer of a supplier.

3. The method of claim 1, wherein the set of performance metrics includes at least one of speed, quality, cost and service.

4. An article of manufacture having computer-readable program mean for creating a supplier rating for rating services of a supplier, the article comprising:
    computer-readable program means for defining a first job attribute vector, the first job attribute vector including a set of sub-attributes, the set of sub-attributes including at least one of a plurality of ranges of tolerance values, a plurality of ranges of quantity values, and a plurality of ranges of times;
    computer-readable program means for defining a first performance vector, the first performance vector including a set of performance metrics;
    wherein each performance metric is based upon the supplier's performance metric relative to an average performance metric for other suppliers that perform a job;
    computer-readable program means for defining an initial rating matrix;
    said initial rating matrix populated by either average supplier ratings or by ratings determined by prior knowledge of a past history of said supplier's performance;
    computer-readable program means for defining a first filter constant, wherein the first filter constant has a value between 0 and 1;
    computer-readable program means for calculating a first matrix, the first matrix based on at least 1 minus the first filter constant and the initial rating matrix;
    computer-readable program means for calculating a second matrix, the second matrix based on at least the first filter constant, the first performance vector, and the first job attribute vector;
    computer-readable program means for adding the first matrix to the second matrix, wherein a feedback matrix is created;
    computer-readable program means for calculating a plurality of performance ratings each corresponding to a metric from the set of metrics from the feedback matrix; and
    computer-readable program means for calculating a final rating value in response to the plurality of performance ratings wherein the final rating is displayed to a customer through an interface in order to assess the supplier.

5. The article of claim 4, wherein the set of sub-attributes is defined using a technical requirements specification of a customer of a supplier.

6. The article of claim 4 wherein the set of performance metrics includes at least one of speed, quality, cost and service.

7. A system for creating a supplier rating for rating services of a supplier, the system including a CPU and a program stored in a computer readable medium configured to execute a set of interface modules, the system comprising:

an interface module that defines a first job attribute vector, the first job attribute vector including a set of sub-attributes, the set of sub-attributes including at least one of a plurality of ranges of tolerance values, a plurality of ranges of quantity values, and a plurality of ranges of times;

an interface module that defines a first performance vector, the first performance vector including a set of performance metrics;

wherein each performance metric is based upon the supplier's performance metric relative to an average performance metric for other suppliers that perform a job;

an interface module that defines an initial supplier rating matrix;

an interface module that defines a first filter constant, wherein the first filter constant has a value between 0 and 1;

an interface module that calculates a first matrix, the first matrix based on at least 1 minus the first filter constant and the initial rating matrix;

wherein said initial rating matrix is populated by either average supplier ratings or by ratings determined by prior knowledge of a past history of said supplier's performance;

an interface module that calculates a second matrix, the second matrix based on at least the first filter constant, the first performance vector and the first job attribute vector;

an interface module that adds the tint matrix to the second matrix, wherein a feedback matrix is created;

an interface module that calculates a plurality of performance ratings each corresponding to a metric from the set of metrics from the feedback matrix; and an interface module that calculates a final rating value in response to the plurality of performance ratings wherein the final rating is displayed to a customer through an interface in order to assess the supplier.

8. The system of claim 7, wherein the set of sub-attributes is defined using a technical requirements specification of a customer of a supplier.

9. The system of claim 7 wherein the set of performance metrics includes at least one of speed, quality, cost and service.

10. A method for creating a supplier rating for a supplier using a computerized server, comprising:

defining an initial supplier rating matrix populated by either average supplier ratings or by ratings determined by prior knowledge of a past history of said supplier's performance;

defining a first job attribute vector, the first job attribute vector including a set of sub-attributes, the set of sub-attributes including at least one of a plurality of ranges of tolerance values, a plurality of ranges of quantity values, and a plurality of ranges of times;

defining a first performance vector, the first performance vector including a set of performance metrics;

wherein each performance metric is based upon the supplier's performance metric relative to an average performance metric for other suppliers that perform a job;

defining a first matrix;

calculating the first matrix based on at least a first filter constant, the first performance vector, and the first job attribute vector;

wherein said first filter constant has a value between 0 and 1;

calculating a second matrix, the second matrix based on at least 1 minus the first filter constant and the initial matrix;

generating a feedback matrix by adding the first matrix to the second matrix;

calculating a plurality of performance ratings each corresponding to a metric from the set of metrics from the feedback matrix; and calculating a final rating value in response to the plurality of performance ratings wherein the final rating is displayed to a customer through a computer interface in order to assess the supplier.

11. The method of claim 10, wherein said computer interface comprises computer interfaces selected from the group consisting of web pages on the internet, web pages on an intranet an Internet appliance, or personal computer.

12. The method of claim 10, in which said computerized server is connected to a communications network comprising communications networks selected from the group consisting of local area networks, wide area networks, or the Internet.

13. The method of claim 12, which said computerized server functions as a web server that provides access to at least one of said various matrix calculations by other users connected to said network.

14. The method of claim 12, in which a hardware and/or software module is used to automatically construct the job attribute vector from data available over a typical corporate network, wherein said typical corporate network carries information comprising information selected from the group consisting of enterprise resource planning, computer aided design (CAD) component geometric attributes, and material specifications.

* * * * *

UNITED STATES PATENT AND TRADEMARK OFFICE
CERTIFICATE OF CORRECTION

PATENT NO. : 7,356,484 B2  
APPLICATION NO. : 09/970455  
DATED : April 8, 2008  
INVENTOR(S) : Benjamin et al.

It is certified that error appears in the above-identified patent and that said Letters Patent is hereby corrected as shown below:

On Title page, in field 74, in column 2, under "Attorney, Agent, or Firm", line 1, delete "Townsned" and insert -- Townsend --, therefor.

On Title page, in field 57, in column 2, under "Abstract", line 13, delete "a" and insert -- an --, therefor.

In column 4, line 14, delete "EIGNER+" and insert -- EIGNER + --, therefor.

In column 7, line 28, after "updating" insert -- . --.

In column 7–8, in Table 1, line 10, delete "3 00" and insert -- 3.00 --, therefor.

In column 7–8, in Table 1, line 15, delete "6" and insert -- 5 --, therefor.

In column 7–8, in Table 1, line 22, delete "001"" and insert -- .001" --, therefor.

In column 7–8, in Table 1, line 24, delete "Matirx" and insert -- Matrix --, therefor.

In column 11, line 32, delete "mth" and insert -- $m^{th}$ --, therefor.

In column 11, line 32, delete "Rm," and insert -- $R_m$, --, therefor.

In column 11, line 65, delete "$m_{th}$" and insert -- $m^{th}$ --, therefor.

In column 11, line 65, delete "$i_{th}$" and insert -- $i^{th}$ --, therefor.

In column 12, line 15, after "of" delete "the".

In column 12, line 15, after "criteria" insert -- . --.

UNITED STATES PATENT AND TRADEMARK OFFICE
CERTIFICATE OF CORRECTION

PATENT NO. : 7,356,484 B2
APPLICATION NO. : 09/970455
DATED : April 8, 2008
INVENTOR(S) : Benjamin et al.

It is certified that error appears in the above-identified patent and that said Letters Patent is hereby corrected as shown below:

In column 13–14, in Table 4, line 8, delete "midling" and insert -- middling --, therefor.

In column 15–16, in Table 5, line 8, delete "midiling" and insert -- middling --, therefor.

In column 20, line 17, in claim 4, delete "mean" and insert -- means --, therefor.

In column 20, line 63, in claim 6, after "4" insert -- , --.

In column 21, line 32, in claim 7, delete "tint" and insert -- first --, therefor.

In column 21, line 44, in claim 9, after "7" insert -- , --.

In column 22, line 33, in claim 11, after "intranet" insert -- , --.

Signed and Sealed this

Tenth Day of November, 2009

David J. Kappos
*Director of the United States Patent and Trademark Office*